3,737,545
α-AMINOBENZYL PENICILLINS
Charles Riffkin, Edison, Carl B. Rifino, Lakewood, and Gilman N. Cyr, Piscataway, N.J., assignors to E. R. Squibb & Sons, Inc., New York, N.Y.
No Drawing. Original application June 6, 1969, Ser. No. 831,225. Divided and this application Feb. 22, 1972, Ser. No. 228,324
Int. Cl. A61k *21/00*
U.S. Cl. 424—271          8 Claims

ABSTRACT OF THE DISCLOSURE

Ampicillin trihydrate having a particle size range from about 5 microns to about 50 microns may be used to form suspensions which are stable, non-irritating, longer-acting, and may be administered in more highly concentrated form.

RELATED APPLICATION

This application is a division of copending application Ser. No. 831,225, filed June 6, 1969.

BACKGROUND OF THE INVENTION

α-Aminobenzyl penicillin, hereafter called ampicillin, which has antibacterial activity against both gram-positive and gram-negative bacteria upon both parenteral or oral administration and which also exhibits resistance to destruction by acid, is disclosed in U.S. Pat. 2,985,648. While ampicillin possesses a broad spectrum of activity, the only sterile injectable form available has been the soluble sodium salt. The solution of this salt, however, has an extremely short shelf-life, about one hour, and the solution is irritating on injection. The irritation appears to be due to its high pH (8.5–9.0) and even buffered solutions are irritating.

It is, accordingly, an object of the present invention to provide ampicillin which does not have the disadvantage of extremely short shelf-life. Another object is to provide ampicillin in a form which is substantially non-irritating. A further object is to provide ampicillin in such a form that effective blood levels are produced in the patient for prolonged periods of time. Still another object is to provide a sterile powder of ampicillin trihydrate from which stable, non-irritating and long-acting suspensions may be prepared. Yet another object is to prepare concentrated suspensions of ampicillin. These and other objects of the present invention will be apparent from the following description.

SUMMARY OF THE INVENTION

It has now been found that ampicillin trihydrate having a particle size range from about 5 microns to about 50 microns may be used to form suspensions which are stable, non-irritating, longer acting, and may be administered in more highly concentrated form.

DETAILED DESCRIPTION

Sterile crystals of ampicillin trihydrate usually occur in the form of long needles. In this form the ampicillin is dilatant and unuseable for preparing suspensions which are to be injected. Traditionally, insoluble solids have been micronized, for example, by air attrition mills or fluid energy mills, to reduce the particle size to from 5 to 10 microns. Typical examples are procaine penicillin G, various steroids, etc. Due to the amphoteric nature of ampicillin, however, extreme difficulties are encountered in preparing suspensions from micronized material. Even at low potency levels of about 200 mg./ml., the suspension is very viscous, foamy and difficult to handle.

It has been found, according to the present invention, that when crystals of ampicillin trihydrate are reduced to an optimum particle size in the range of from about 5 microns to about 50 microns, the crystals no longer behave in a dilatant manner when suspended in water. Surprisingly, the suspensions are stable for up to a year when stored under refrigeration, and, when administered to patients, provide effective ampicillin levels for more than twice as long as solutions of sodium ampicillin. It has also been found that highly concentrated suspensions may be prepared.

The ampicillin starting material for the present invention may be prepared as described in U.S. Pat. 2,985,648. At temperatures below about 40° C. the ampicillin is present as ampicillin trihydrate. The ampicillin trihydrate is dissolved in water by reducing the pH to about 1.2, for example, by addition of concentrated HCl. After the ampicillin trihydrate is solubilized, it is sterilized, for example by passing through a millipore filter. The filtrate is collected in a sterile vessel. The pH is then raised to from about 4.0 to about 5.0 by the addition of sterile 20% NaOH. In this pH range, substantially all of the ampicillin trihydrate is crystallized. The sterile crystals are separated, washed and dried aseptically. The ampicillin trihydrate crystals so produced have a particle size range of from about 5 microns to about 100 microns. Only a very small percentage of the crystals have a particle size below about 10 microns. The majority of the crystals, about 85%, have a particle size above about 20 microns, and within the range of from about 20 microns to about 100 microns. The yield is approximately 80% or higher.

The ampicillin trihydrate crystals are next reduced to a useful particle size in the range of from about 5 microns to about 50 microns by, for example, aseptic micropulverization. Micropulverization or mechanical grinding produces a product which has larger particle size range than that made by either attrition mills or fluid energy mills. At least 50% of the material, and preferably at least 70%, should have a particle size in the range of from about 20 microns to about 50 microns. This particle size material yields a more manageable suspension which can be formulated to higher potencies. This is desirable from the standpoint of medical practice since it reduces the size of the injection and still provides an adequate dosage regimen.

The sterile ampicillin trihydrate of the present invention may be stored as the powder, or as a dry mixture containing other sterile excipients such as, for example, suspending agents and dispersing agents. A suitable dispersing agent is lecithin, and a suitable suspending agent is sodium carboxymethylcellulose.

The ampicillin trihydrate having a particle size in the range of from about 5 microns to about 50 microns is combined with water for injection to form a suspension having from about 250 to about 550 mg. of ampicillin activity (as determined by biological assay) per ml.

The suspensions of the present invention may be buffered to maintain the pH in the range of from about 4.0 to about 7.0, preferably from about 4.5 to about 5.0. An example of a suitable buffer is an acetate buffer.

The sterile ampicillin trihydrate suspensions of the present invention are less irritating on injection in contrast to the only other injectable form, sodium ampicillin. A further advantage of sterile aqueous suspensions of the present invention is their prolonged shelf-life. Pre-formed aqueous suspensions of sterile ampicillin trihydrate, prepared according to the present invention, are stable for at least one year when stored under refrigeration. In addition, the suspensions of the present invention are long acting and produce effective blood levels of ampicillin for prolonged periods of time. This prolonged effectiveness reduces the number of injections required in the therapeutic treatment.

The sterile suspensions of the present invention are intended to be applied parenterally, for example, by subcutaneous or intramuscular injection.

The following examples illustrate the present invention without, however, limiting the same thereto.

EXAMPLE 1

Ampicillin trihydrate (1.2 kg.) is dissolved in water (12 liters) by reducing the pH to about 1.2 by addition of concentrated HCl, passed through a millipore filter, type GS, and the filtrate collected in a 20 liter sterile bottle. Ampicillin trihydrate is precipitated by raising the pH to about 4.3 by addition of sterile 20% NaOH. The sterile crystalline precipitate is separated, washed with sterile water for injection (2–3 liters), then with sterile acetone (1–2 liters) and vacuum dried. The yield is approximately 83% of ampicillin trihydrate needle-like crystals having a particle size range of from about 5 to about 100 microns, the majority of the crystals having a particle size above 50 microns.

EXAMPLE 2

One thousand parts by weight of sterile needle crystals of ampicillin trihydrate are ground in a micropulverizer, type CF (American Marietta Co.) fitted with an .027 round screen. Alternatively a tornado mill or hammer mill may be used, equipped with appropriate size mesh screen. The resulting sterile micropulverized ampicillin trihydrate is aseptically blended with 89 parts of sterile lecithin which has been micropulverized in the same manner, and 1.35 parts of sterile sodium carboxymethylcellulose. The sterile powder blend is then aseptically filled into sterile vials for use as an intramuscular injection, after reconstitution with sterile water or saline.

EXAMPLE 3

When approximately 1.1 gm. of the sterile powder blend of Example 2 is filled into sterile glass vials and reconstituted by adding 1.6 cc. of water for injection, a sterile suspension is obtained which upon intramuscular injection provides high and sustained blood levels of ampicillin. This was demonstrated as follows:

INTRAMUSCULAR INJECTION OF 400 MG./ML.—AMPICILLIN ACTIVITY IN DOGS—BLOOD LEVELS IN MCG./ML.[1]

|  | 0 hour | 1 hour | 3 hours | 7 hours |
|---|---|---|---|---|
| Ampicillin suspension | 0 | 9.4 | 12.0 | 6.0 |
| Sodium ampicillin suspension | 0 | 20.6 | 11.6 | 0.5 |

[1] A level of at least 1 mcg./ml. is required for antibiotic effectiveness

EXAMPLE 4

Four hundred parts by weight of sterile ampicillin trihydrate which has been micropulverized in the manner described in Example 2 are combined with 50 parts by weight of sterile lecithin and one part of sodium carboxymethylcellulose. 1.3 parts by weight of methyl paraben and 0.2 part by weight of propyl paraben are added as preservatives. 0.1 part by weight of acetate buffer having a pH of 5.0 and sufficient water to make 1000 parts by weight are then added. The suspension is aseptically homogenized and filled into sterile vials for use as a multiple dose injection. Full potency is retained for at least one year when stored in the refrigerator.

What is claimed is:

1. A composition adapted to form aqueous suspensions of ampicillin trihydrate comprising an antibacterially effective amount of sterile, substantially non-dilatant ampicillin trihydrate having a particle size in the range of from about 5 microns to about 50 microns, at least 50% of the ampicillin trihydrate having a particle size in the range of from about 20 microns to about 50 microns, suspending agent and dispersing agent.

2. A composition according to claim 1 wherein the dispersing agent is lecithin.

3. A composition according to claim 1 wherein the suspending agent is sodium carboxymethylcellulose.

4. A composition according to claim 1 combined with a quantity of water sufficient to provide a suspension having from about 250 mg. to about 550 mg. of ampicillin trihydrate activity per ml.

5. A composition according to claim 4 which contains an amount of acidic buffer effective to maintain the pH in the range of from about 4.0 to about 7.0.

6. A composition according to claim 1 wherein at least 70% of the ampicillin trihydrate has a particle size in the range of from about 20 microns to about 50 microns.

7. A composition according to claim 6 wherein the dispersing agent is lecithin.

8. A composition according to claim 6 wherein the suspending agent is sodium carboxymethylcellulose.

References Cited

UNITED STATES PATENTS 3,157,640  11/1964  Johnson et al. _____ 260—239.1

JEROME D. GOLDBERG, Primary Examiner